Patented Mar. 22, 1927.

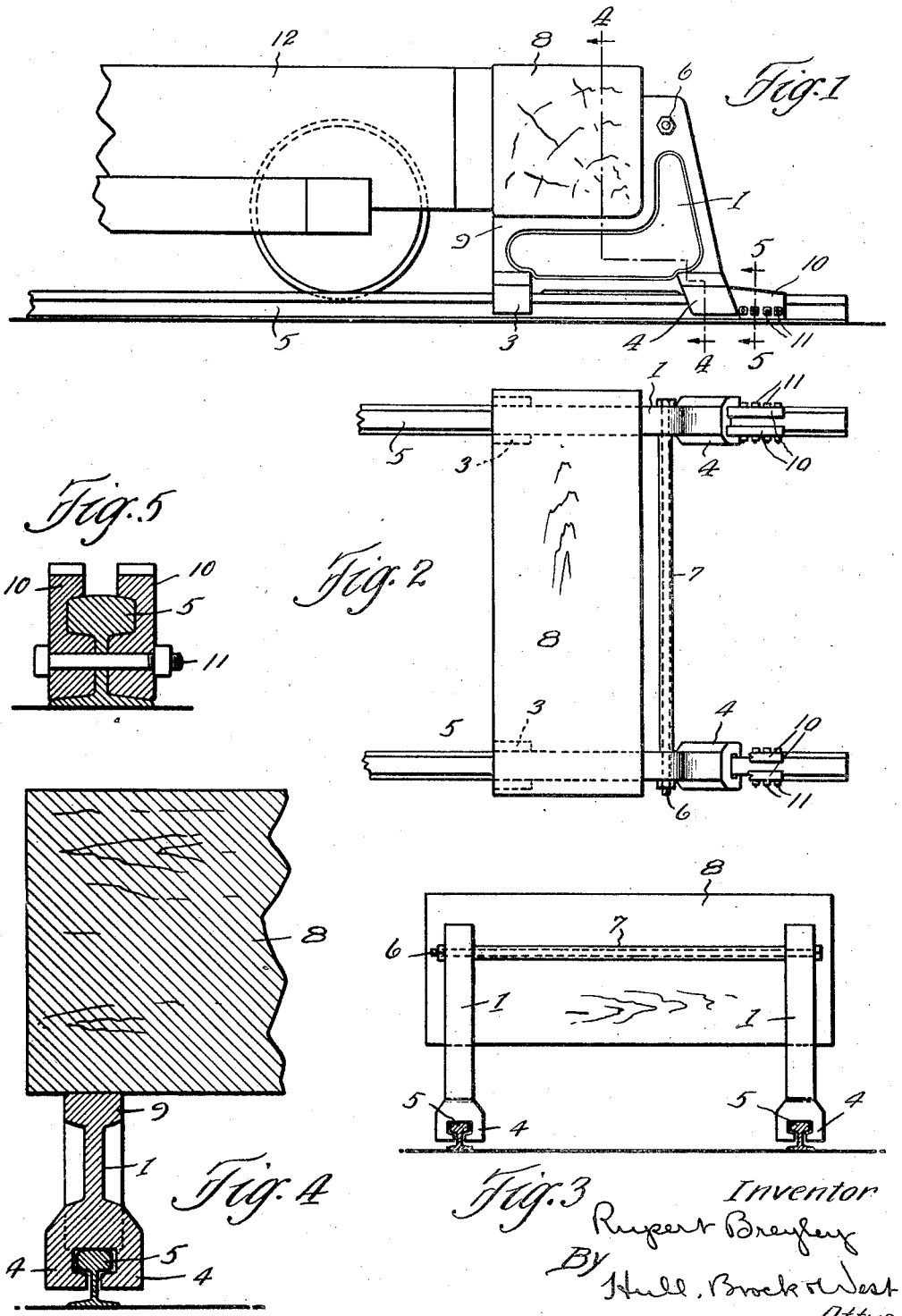

1,621,708

UNITED STATES PATENT OFFICE.

RUPERT BREYLEY, OF PAINESVILLE, OHIO.

CAR BUMPER.

Application filed April 1, 1925. Serial No. 19,795.

The purpose of this invention is to provide a highly efficient car bumper that is comprised of a minimum number of very simple parts that are cheap of manufacture and particularly convenient of assembly. The bumper is designed for mounting directly upon the rails of a track for engagement with fixed abutments thereon so as to be incapable of shifting with respect to the track under the influence of an impact, while, on the other hand, it is yieldable in two respects, first, in respect to the shock of the impact, and, second to compensate for relative movement between the opposed rails, thus relieving the elements of the bumper of undue strains when the bumper is engaged by a heavy car or truck, the elements being connected together and to the track with relatively loose joints.

The fact that the bumper is carried solely by the rails permits it to be shifted either lengthwise of a track or from one track to another without disturbing the track bed in case it becomes necessary or desirable to change its location.

While my improved bumper is suitable for general use, it is especially adapted for employment in shops and foundries for stopping so-called ingot buggies or trucks.

In the accompanying drawing, Fig. 1 shows a section of a track in side elevation with the bumper mounted thereon and engaged by a truck or ingot buggy; Fig. 2 is a plan view of the bumper; Fig. 3, a rear elevation thereof; Fig. 4 is an enlarged sectional detail on the line 4—4 of Fig. 1; and Fig. 5 is a similar detail on a further enlarged scale of one of the abutments, the plane of section being indicated by the line 5—5 of Fig. 1.

The bumper consists of two identical and therefore interchangeable chair-shaped housings 1 and 2 which have formed integral with their lower front and rear corners claws 3 and 4 which are designed to loosely embrace the balls of the rails 5. The opposed housings are tied together adjacent their upper ends by a rod or bolt 6, and are maintained a fixed distance apart by a tubular spacer 7 that is applied to the bolt or rod.

A bolster 8, preferably composed of a heavy timber. rests upon the seat portions 9 of the housings 1 and 2. While it is not regarded as essential under ordinary circumstances, the bolster may, if desired, be connected by suitable means to the housings 1 and 2.

The housings are adapted to be applied to the rails 5 by engaging the claws 3 and 4 over the ends of the rails, and when the housings are shifted to about the desired location upon the rails, abutments 10 are secured to the rails immediately in advance of the bumper, as by means of bolts 11. These abutments are designed to be engaged by the claws 4 of the housings 1 and 2 and prevent shifting the bumper in the direction in which it would have a tendency to move under the impact of a car or truck. In Fig. 1, the bumper is shown as engaging the abutments 10, and as being engaged by an ingot buggy or truck 12.

By reason of the inherent yielding quality of the wooden bolster 8 the housings 1 and 2 are relieved somewhat of the shock incident to the impact of the truck with the bumper, and the loose connections between the bolster and the housings and between the housings and the rails, allow the elements of the bumper to give with respect to each other sufficiently to compensate for any weaving of the track under the load of the truck 12 without imposing strains upon the elements of the bumper. It is desirable for this reason that the housings 1 and 2 be not bolted directly to the rails.

From this disclosure it will be seen that my invention provides a structure through which the objects above enumerated are effectually attained. The opposed housings 1 and 2 are as above stated, interchangeable, and each preferably consists of an integral casting of suitable metal. These housings, with the abutments 10, constitute the only specially constructed parts in the bumper. The bolts or rods 6 may be of standard variety, and the spacer 7 a length of standard pipe of suitable diameter. The bolster 8 is cut, in proper length, from stock timber of a standard cross-section.

Having thus described my invention, what I claim is:

1. A car bumper comprised of chair-shaped housings loosely applied to the opposed rails of a track, each of said housings consisting of an integral member, means tying together and spacing apart the upper ends of the opposed housings, abutments secured to said rails for engagement by the housings, and a timber loosely resting upon the seat portions of said chair-shaped housings in a position to engage the back portions thereof.

2. A car bumper comprised of two chair-shaped housings having claws at their lower ends that are designed to loosely embrace the ball of a rail, each of said housings consisting of an integral member the respective housings being adapted for application to the opposed rails of a track, abutments secured to the rails immediately in advance of the housings, and a bolster resting upon the seat portions of the chair-shaped housings in a position to engage the back portions thereof.

3. A car bumper comprising, in combination, two identical chair-shaped housings having seat and back portions and equipped at their lower ends with claws designed to embrace the balls of opposed rails of a track, stops adapted to be secured to the opposed rails immediately in advance of said housings, means tying together and spacing apart the upper ends of the housings, and a bolster resting upon the seat portions of the said housings and engaging the back portions thereof.

In testimony whereof, I hereunto affix my signature.

RUPERT BREYLEY.